United States Patent
Gottfriedsen et al.

(10) Patent No.: US 8,853,567 B2
(45) Date of Patent: Oct. 7, 2014

(54) ELECTROMAGNETIC FORCE COMPENSATING WEIGHING DEVICE WITH MOUNTING SYSTEM COMPENSATING FOR MECHANICAL STRESSES

(75) Inventors: Jan Gottfriedsen, Waldfischbach-Burgalben (DE); Tobias Stellwagen, Kaiserslautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 358 days.

(21) Appl. No.: 13/239,203

(22) Filed: Sep. 21, 2011

(65) Prior Publication Data
US 2012/0181094 A1 Jul. 19, 2012

(30) Foreign Application Priority Data
Sep. 22, 2010 (EP) .................................. 10401168

(51) Int. Cl.
*G01G 21/24* (2006.01)
*G01G 23/48* (2006.01)
*G01G 21/23* (2006.01)

(52) U.S. Cl.
CPC ................ *G01G 23/48* (2013.01); *G01G 21/23* (2013.01); *Y10S 177/09* (2013.01)
USPC ...................................... 177/229; 177/DIG. 9

(58) Field of Classification Search
USPC .............. 73/862.045, 862.041; 177/211, 229, 177/DIG. 9
See application file for complete search history.

(56) References Cited

U.S. PATENT DOCUMENTS

| | | | |
|---|---|---|---|
| 4,125,168 A * | 11/1978 | Ormond | 177/211 |
| 4,522,066 A * | 6/1985 | Kistler et al. | 73/781 |
| 4,600,066 A * | 7/1986 | Griffen et al. | 177/211 |
| 4,655,306 A * | 4/1987 | Saner | 177/229 |
| 4,949,799 A * | 8/1990 | Wernimont | 177/211 |
| 5,205,369 A * | 4/1993 | Neeleman | 177/229 |
| 5,250,762 A * | 10/1993 | Gustafsson et al. | 177/244 |
| 6,470,759 B1 * | 10/2002 | Scott | 73/862.639 |
| 6,787,714 B2 | 9/2004 | Iiduka | |
| 6,812,414 B2 * | 11/2004 | Nakagawa | 177/211 |
| 6,886,418 B2 | 5/2005 | Metzger et al. | |
| 7,220,924 B2 * | 5/2007 | Burkhard | 177/229 |
| 7,318,358 B2 * | 1/2008 | Kistler | 73/862.045 |
| 7,361,852 B2 | 4/2008 | Leahy et al. | |
| 7,365,276 B2 * | 4/2008 | Burkhard | 177/229 |

(Continued)

FOREIGN PATENT DOCUMENTS

| | | |
|---|---|---|
| DE | 195 35 202 C1 | 11/1996 |
| DE | 10 2005 033 952 A1 | 2/2007 |

(Continued)

OTHER PUBLICATIONS

JPO, Notification of Reasons for Refusal issued Jun. 28, 2013 in corresponding Japanese Patent Application No. 2011-207940 (9 pages).

*Primary Examiner* — Randy W Gibson
(74) *Attorney, Agent, or Firm* — The Culbertson Group, P.C.

(57) ABSTRACT

A weighing device, particularly an electromagnetic force compensating weighing device, with a weighing sensor unit connected in at least three mounting regions to a second unit such as a carrier unit or intermediate load plate. The second unit or the weighing sensor unit has connecting regions in at least two mounting regions, which employ a hinge structure that allows an essentially translatory shifting motion of the connecting region to avoid stress caused by temperature related expansion.

20 Claims, 5 Drawing Sheets

(56) References Cited

U.S. PATENT DOCUMENTS

| | | | |
|---|---|---|---|
| 7,851,713 B2 * | 12/2010 | Burkhard et al. | 177/210 EM |
| 2005/0121237 A1 * | 6/2005 | Kusumoto | 177/229 |
| 2008/0006451 A1 | 1/2008 | Leahy et al. | |
| 2008/0006452 A1 | 1/2008 | Leahy et al. | |

FOREIGN PATENT DOCUMENTS

| | | |
|---|---|---|
| EP | 1 288 636 B1 | 9/2005 |
| JP | H10-185672 | 7/1998 |
| JP | 2003-227743 A | 8/2003 |

* cited by examiner

ELECTROMAGNETIC FORCE COMPENSATING WEIGHING DEVICE WITH MOUNTING SYSTEM COMPENSATING FOR MECHANICAL STRESSES

FIELD OF THE INVENTION

The invention pertains to a weighing device, particularly an electromagnetic force compensating weighing sensor device with a mounting system that compensates for mechanical stresses due to material expansion.

BACKGROUND

In weighing sensor technology, it is frequently required to connect components of different materials to one another, where one of the components such as, for example, a load cell is sensitive to mechanical stresses. Mechanical stresses of this type may be created when the two components are connected, or may be caused by different thermal expansions after a temperature change, namely even if the two components were connected to one another in a stress-free fashion at the initial temperature.

In an electrodynamic force compensating load cell, the lever gear is frequently machined out of an aluminum block. The base plate, in contrast, frequently consists of another material such as, for example, stainless steel. However, the entire housing of the load cell may also consist of aluminum. Further, the frame to which the load cell should be connected, for example, with the aid of screws, may be made of steel. In this case, one encounters the problem that the contact surfaces deform or even shift relative to one another if temperature changes occur. Under certain circumstances, the geometry changes or the generated mechanical stresses may extend as far as the sensor that acquires the measured values and may cause measuring errors.

In order to prevent such stresses that affect the accuracy of the sensor, German Patent Reference No. DE 10 2005 033 952 B4 proposes to fix the actual weighing system on a base plate by means of holding clamps that are connected to the base plate. The weighing system can then be connected to the holding clamps in a self-supporting fashion, for example, with the aid of screws. In this way, at least distortions of the base plate are not transmitted to the weighing system. However, thermal stresses resulting from different coefficients of expansion of the materials of the weighing system and the clamps also cannot be prevented with this type of mounting.

German Patent Reference No. DE 602 06 339 T2 discloses a mounting for a base body of an electromechanical force compensating load cell, wherein the base body features lateral flange elements that protrude over the actual load-sensing system and contain bores for mounting screws. This is intended to prevent stresses caused by the assembly from being transmitted to regions of the load cell, in which stresses can affect the accuracy of the measuring result. Since the flange elements are realized integrally with the remaining base body, however, such stresses cannot be reliably prevented.

A similar approach is described in German Patent Reference No. DE 195 35 202 C1. In this case, mounting regions are isolated by means of incisions in the base body so as to prevent stresses or distortions generated in these regions from being transmitted to the actual sensor region, i.e., the region of the base body that affects the accuracy of the measurement.

However, these known options ultimately are hardly able to prevent the measuring accuracy from being affected in load sensors or load sensor regions of weighing devices that already react sensitively to slight mechanical stresses.

SUMMARY OF THE INVENTION

Provided is a weighing device in which stresses are prevented from being transmitted to the sensitive region of the weighing sensor unit and from negatively affecting the accuracy of the measurement or the temperature stability and long-term stability of the weighing device when the actual weighing sensor unit is assembled and when temperature fluctuations occur after the assembly.

The devices herein take advantage of the phenomenon that expansions due to temperature changes correspond to a mathematical similarity function. That is, the aspect ratios and angles of the body are preserved. The shifts of the mounting points relative to one another during temperature-related expansions of elements that consist of different materials therefore are not arbitrary, but rather are subject to the aforementioned regularity.

A preferred system includes two components with different materials which are connected to one another in at least three mounting regions. The mounting regions, i.e., the regions of the two components in which the components are rigidly connected to one another in a positive, non-positive or integral fashion, have a small size in comparison with the overall dimensions of the components such that stresses that may be generated within the mounting regions can be neglected with respect to their effect on the weighing sensor unit. The mounting regions would ideally be point-shaped, but this typically cannot be technically realized. In practical applications, the mounting regions have the dimensions, for example, required for realizing a screw connection.

The weighing sensor unit of the weighing device represents one of the two components to be connected to one another, wherein the weighing sensor unit is connected to another unit, such as, for example, a carrier plate or a load plate, in the at least three mounting regions. In the context of this description, the weighing sensor unit of the weighing device includes everything that is rigidly (integrally or detachably) connected to the actual sensor region to which the load force is applied. For example, the weighing sensor unit may consist of the so-called monobloc of an electromagnetic force compensating measuring cell, as well as of a housing in which such a monobloc is accommodated. The inventive mounting may be realized, in particular, between the weighing sensor unit or the monobloc as it is sometimes called, and a bottom plate or carrier plate or between a housing that accommodates and is rigidly connected to the monobloc and a bottom plate or carrier plate, wherein the bottom plate represents the other unit in accordance with the terminology of the present description. However, the mounting may also be realized, for example, between another unit such as a load plate and the weighing sensor unit or a monobloc, respectively.

According to the invention, a connecting region is respectively arranged either on the weighing sensor unit, or on the other unit to be connected thereto, in at least two of the at least three mounting regions. Consequently, each connecting region is respectively connected to or supported on the weighing sensor unit or the other unit by means of a hinge structure in such a way that it can carry out a linear (translatory) or at least approximately linear shifting motion in the direction of the connecting line between an arbitrary common reference point for all connecting regions and a center of the respective mounting region. In this way, temperature-related expansions do not lead to increased stresses in the interconnected components, but rather to a linear motion of the mounting regions relative to the chosen reference point. The motion travel realized with the aid of the hinge structure needs to be at least as large as the maximum difference between the temperature-related expansions of the other unit and the weighing sensor unit along the line between the reference point and the respective center of the connecting region in a predefined temperature range.

According to the invention, each connecting region may be connected to the base body or the carrier unit by means of a flexure hinge in such a way that the above-described freedom of motion is achieved. The flexure hinge may be realized monolithically with the base body or the unit connected thereto or by means of separate elements such as, for example, leaf springs.

According to the preferred embodiment of the invention, the hinge structure includes at least one weak zone.

According to an embodiment of the invention, the other unit essentially is rigidly connected to the weighing sensor unit in one of the mounting regions and the center of this mounting region forms the reference point. Instead of a completely rigid connection, however, a connecting region may also be realized on the weighing sensor unit or the other unit in this mounting region that defines the reference point, wherein this connecting region allows at best a marginal translatory motion in the desired direction. However, this connecting region may be realized in such a way that it allows a tilting motion or a slight translatory motion in the directions required for preventing stresses from already being generated in the mounting regions during the assembly due to manufacturing tolerances of the contact surfaces of the two components. For example, such a "reference point connecting region" may be connected to the remainder of the respective component by means of one or more weak zones, wherein the weak zones allow the required slight tilting motions or translatory motions in directions other than the directions between the reference point and the centers of the mounting regions. Such additional motions are also realized in the connecting regions that do not define a reference point with the aid of the inventive flexure hinges.

According to another embodiment of the invention, the mounting regions may lie in one plane, i.e., all contact surfaces in the connecting regions lie in one plane. In this way, the inventive stress-free coupling between the two components can be realized in a constructively simple fashion. Generally, the contact surfaces naturally may also be arbitrarily positioned 3-dimensionally.

In an alternative embodiment, the reference point may lie on the straight line that is defined by the axis in which the load force acts upon the weighing sensor unit, wherein the reference point is preferably chosen in the intersecting point of the load force direction with this plane in the above-described instance in which all mounting regions are realized in one plane.

In one embodiment, the connecting regions may be provided on the unit to be connected to the weighing sensor unit that may be realized, for example, in the form of a carrier plate or load plate.

According to the preferred embodiment, the hinge structure includes at least one coupling element, the ends of which are respectively connected to the connecting region by means of a first hinge that is preferably realized in the form of a weak zone and to the unit to be connected to the weighing sensor unit or to the weighing sensor unit itself by means of a second hinge that is preferably realized in the form of a weak zone, wherein the pivoting axes of the hinges extend parallel to one another and perpendicular to the direction of the straight connecting line through the center of the respective connecting region and the reference point.

The hinges are preferably realized in such a way that the plane defined by the pivoting axes lies perpendicular to the straight connecting line through the reference point and the center of the respective connecting region. Depending on the distance between the pivoting axes, this results in an optional shifting motion for the connecting region along a circular path, the center of which is defined by the pivoting axis that lies farther away. In this case, the connecting region itself can remain in its rotational alignment due to the hinge connection to the coupling element by means of the nearer weak point, i.e., the connecting region itself is not pivoted. Consequently, the connecting region can be rigidly connected to the other respective component, for example, with the aid of screws. The shifting motion itself takes place along a circular path, the radius of which is defined by the distance between the two pivoting axes. Since an essentially linear translatory motion is desired in the direction along the straight connecting line through the reference point and the center of the respective connecting region, the distance between the pivoting axes should be chosen so large that the curvature of the predefined line of motion is negligible in comparison with the desired linear motion travel. In other words, the radius of the predefined line of motion is chosen so large that the condition of the lateral offset caused by the circular path being small in comparison with the corresponding motion travel in the desired direction is fulfilled over the entire desired motion travel in the direction of the straight connecting line between the reference point and the center of the connecting region.

According to another embodiment, the hinge structure may include two (or even more) coupling elements that are connected by means of hinges of this type and arranged in a parallelogram-like fashion. Consequently, the connecting region is fixed in its position such that it cannot carry out a pivoting motion, but rather only the above-described shifting motion along the predefined circular path in the plane lying perpendicular to the two pivoting axes of the weak zones, even without being rigidly connected to the other respective element.

According to another embodiment, the hinge structure may comprise two or more coupling elements that are respectively connected to the connecting region and to the unit to be connected to the weighing sensor unit or to the weighing sensor unit itself by means of two hinges that may once again be realized in the form of weak zones, wherein the respective hinge axes of a coupling element lie in one plane, and wherein one or more coupling elements are respectively arranged on opposite sides of the connecting region.

The weighing sensor unit may feature mounting legs that stand on connecting regions of the unit connected thereto and are connected to these connecting regions, preferably by means of screws. In this way, a simple, constructive and cost-efficient design is achieved. Also, the unit connected to the weighing sensor unit may analogously feature mounting legs that stand on and are connected to connecting regions of the weighing sensor unit.

While some embodiments are included in this summary, other embodiments may fall within the scope as determined from the detailed description below, the drawings, and the dependent claims.

DETAILED DESCRIPTION OF PREFERRED EMBODIMENTS

Figure 1:
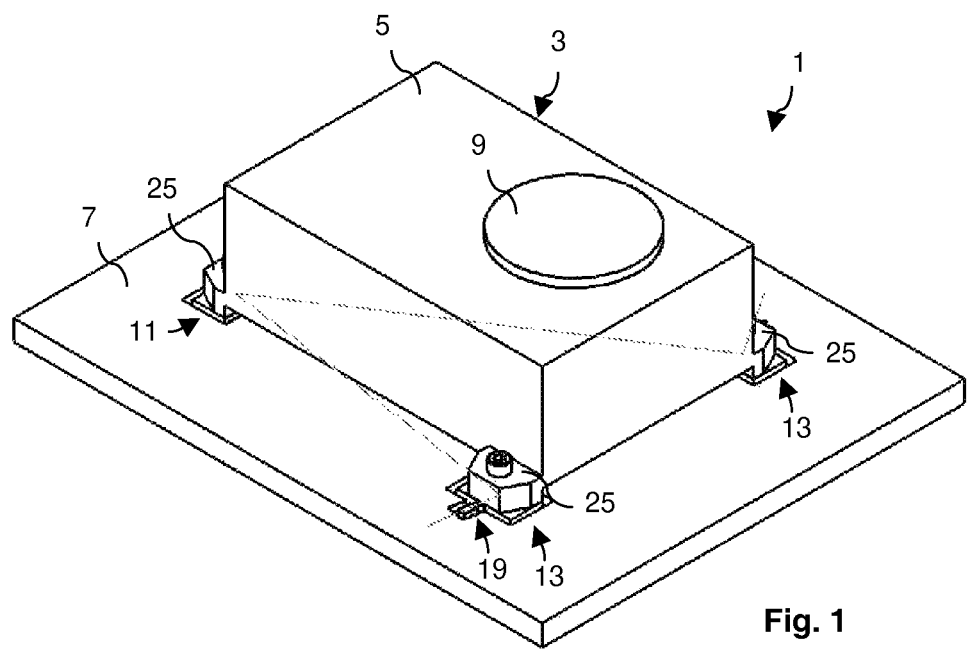
FIG. 1 shows a perspective top view of a weighing device consisting of a load cell that is mounted on a carrier plate in three mounting regions, wherein one of the mounting regions forms an essentially stationary reference point.

The weighing device 1 illustrated in FIG. 1 comprises a weighing sensor unit 5 that is implemented in the form of a load cell 3. The weighing sensor unit 5 features a housing, in which the actual (not-shown) weighing sensor is arranged. The weighing sensor may operate, for example, in accordance with the principle of electromagnetic force compensation and comprise a base body with a stationary region, on which a load receptacle 9 is arranged by means of two parallelogram guides. The motion of the parallelogram guides can be transmitted to a lever arm of the last lever via a single-stage or multistage lever mechanism. A magnet system arranged on the last lever comprises an electromagnet, the coil current of which is controlled in such a way that the respective last lever arm is held in a defined position. The coil current then serves as a measurement for the load force acting upon the load receptacle 9.

However, the weighing sensor unit 5 may, in principle, also be realized in any other suitable way. The techniques herein are provided to connect a weighing sensor unit 5 of a weighing device 1 that is sensitive to mechanical stresses, namely a complete load cell or only the actual weighing sensor, to another unit or component such as, for example, a carrier unit realized in the form of a carrier plate 7 in such a way that different temperature-related expansions resulting from the use of different materials for the two components do not lead to impermissibly high stresses in the two components, particularly the weighing sensor unit 5.

In the embodiment illustrated in FIG. 1, the load cell 3 is connected to the carrier plate 7 in three mounting regions 11 and 13, wherein the connection in the mounting region 11 is essentially realized rigid or stationary and the mounting regions 13 allow slight relative motions between the load cell 3 or the housing 5 of the load cell 3 and the carrier plate 7. The essentially rigid or stationary mounting region 11 serves as a reference point R (FIG. 3).

Figure 2:
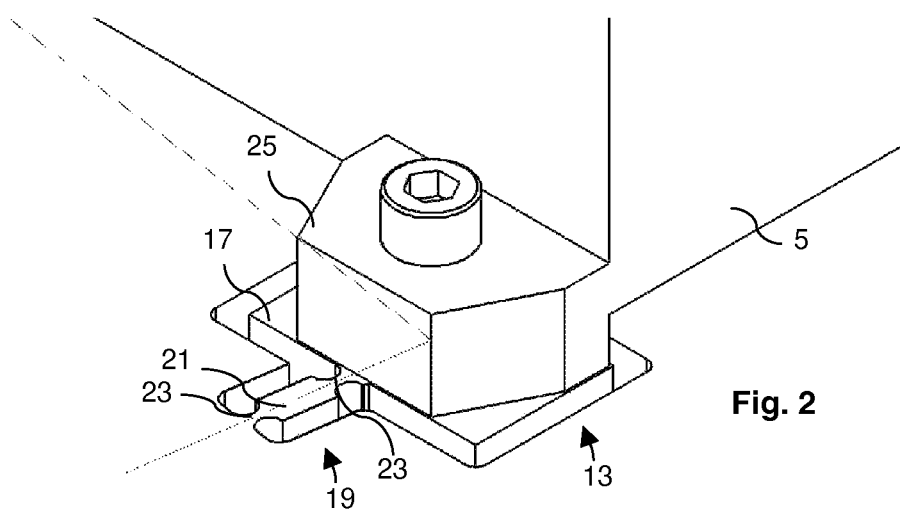
FIG. 2 shows an enlarged illustration of a mounting region of the embodiment according to FIG. 1.
Figure 3:
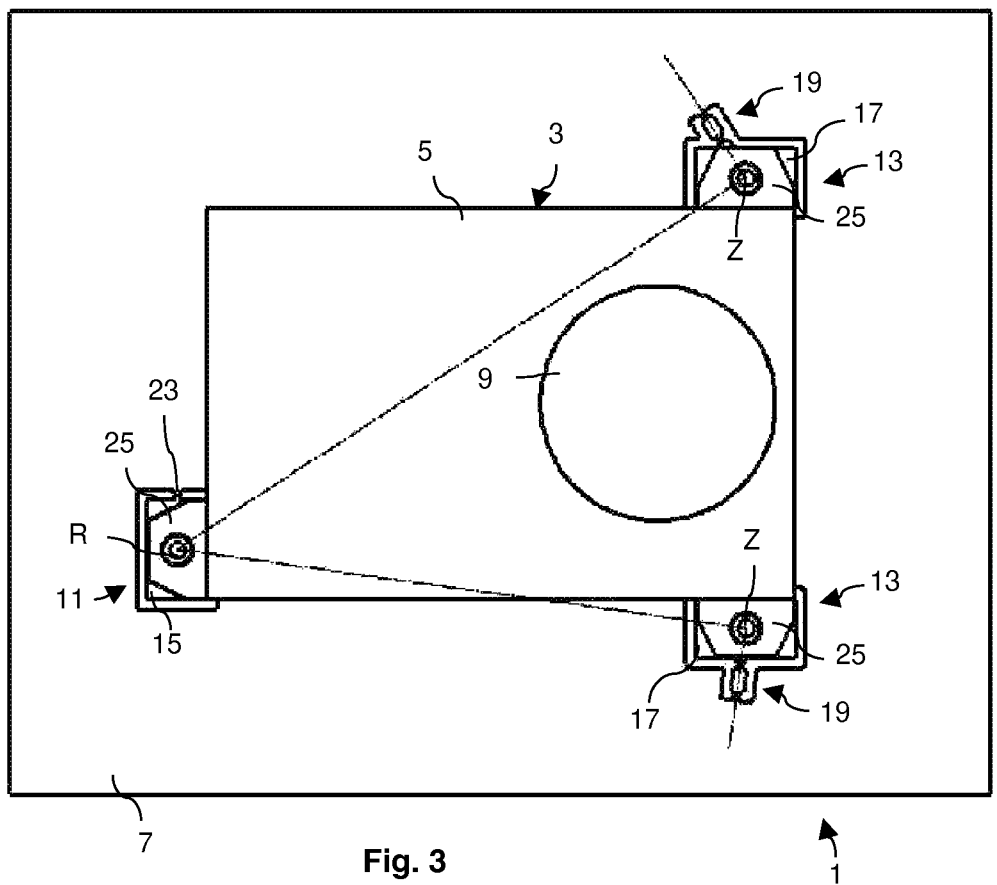
FIG. 3 shows a top view of the weighing device according to FIG. 1.

Referring to FIGS. 1-3, in the mounting regions 11, 13, connecting regions 15, 17 are realized in the carrier plate, wherein the connecting regions 17 can be respectively moved along the straight connecting line extending through the reference point R and the center Z of the connecting region 17 in an essentially translatory fashion. For example, the center Z of the connecting regions 17 may be defined as the center of gravity of the surface of the respective connecting region 17. However, the exact position of the center Z ultimately is not very important in practical applications because the spatial dimensions of the mounting regions 11, 13 and the connecting regions 15, 17 respectively need to be chosen small in comparison with the spatial dimensions of the load cell 3 so as to prevent thermal stresses from being generated in the mounting regions 11, 13 due to a positive, non-positive or even integral connection between the two components.

The locations of the centers Z and the reference point R respectively lie in the contact surfaces between the load cell 3 and the carrier plate 7 or the respective connecting regions 15, 17.

At this point, it should be noted that the mounting regions or the contact surfaces, in which the load cell 3 and the unit is implemented, for example, in the form of a carrier plate 7 contact one another, lie in one plane in the embodiments illustrated in the figures. However, this is not required for implementing the invention. In fact, the mounting regions may also be provided in any suitable spatial arrangement.

In any case, the connecting regions 17 that allow an essentially translatory relative motion between the two components need to be arranged on the respective component, i.e., on the carrier plate 7 and on the weighing sensor unit 5, such that the respectively desired translatory motion takes place along the respective straight connecting line between the reference point R and the center Z of the corresponding connecting region 17.

According to FIGS. 1-3, the connecting regions 15, 17 that can be moved in an essentially translatory fashion are connected to the carrier plate 7 by means of a hinge structure 19 that is realized in the form of a flexure hinge structure.

At this point, it should be noted that an essentially translatory shifting motion, i.e., a linear shifting motion, can also be approximated by means of a shifting motion along a curved path (that lies in one plane). This curved path may consist, for example, of a circular path with a sufficiently large radius.

The hinge structure 19 consists of a coupling element 21 (FIG. 2) that is connected to the carrier plate 7 by means of a hinge that is realized in the form of a weak zone 23 and to the connecting region 17 by means of another hinge that is realized in the form of a weak zone 23. When the connecting region 17 is respectively connected to one leg 25 of the housing 5 of the load cell 3 by means of the screw connection illustrated in FIGS. 1-3, the non-positive connection between the leg 25 and the connecting region 17 blocks a basically possible rotational motion of the connecting region 17 about the pivoting axis defined by the weak zone 23 between the coupling element 21 and the connecting region 17. Consequently, the connecting region 17 and the leg 25 connected thereto are left with the option of an essentially translatory motion in the direction of the straight connecting line between the reference point R and the respective center Z of the connecting region 17. Strictly speaking, this motion is a circular motion, wherein the radius of the circular motion is defined by the distance between the pivoting axes formed by the weak zones 23. Since the relative motions between the housing 5 and the carrier plate 7 caused by thermal expansions are relatively small, it suffices to also choose a relatively small distance for the coupling element 21 or the distance between the pivoting axes of the weak zones 23 in order to approximate the desired translatory motion with sufficient accuracy by means of the actual circular motion.

According to FIG. 2, the connecting region can be realized with simple machining of the carrier plate 7. This also applies to the realization of the coupling element 21 and the weak zones 23. The weak zones 23 should be realized with such a thickness that a sufficient strength or robustness of the coupling of the connecting region 17 to the carrier plate 7 is ensured and that a sufficiently low resistance to bending motions about the respective pivoting axis is realized. The flexure hinges 19 preferably are also implemented such that vibratory motions between the load cell 3 and the carrier plate 7 as a result of motions such as, for example, vibrations acting upon these components, are largely prevented or sufficiently dampened.

According to FIG. 2, the coupling element 21, as well as the weak zones 23, may be implemented symmetrically with regard to a center plane. In this case, the pivoting axes of the weak zones 23 lie in the respective center plane in the region of the smallest thickness of the weak zones 23. However, it is also possible to arrange and realize the weak zones 23 and the coupling element 21 differently. It merely needs to be ensured that the circular motion defined by the coupling element and the two weak zones 23 approximates the desired translatory motion with sufficient accuracy.

However, the arrangement in the mounting region 13 illustrated in FIG. 2, in which the center plane or the plane defined by the two pivoting axes of the weak zones 23 extends perpendicular to the desired moving direction, has the advantage that the thusly defined circular motion respectively only deviates slightly from the desired translatory moving direction in both moving directions.

According to FIGS. 1 and 3, the connecting region 15 in the mounting region 11 may also be connected to the carrier plate 7 by means of a weak zone 23. This weak zone 23 at best allows minimal motions of the connecting region 15 and the reference point R, respectively. The main function of this weak zone 23 consists of compensating manufacturing tolerances with respect to the evenness of the carrier plate 7 and the lower contact surfaces of the legs 25 of the housing 5 that ideally should lie in one plane, namely by means of a deformation of the weak zone 23. In this case, the weak zone 23 allows slight tilting motions in order to press the surface of the connecting region 15 against the underside of the corresponding leg 25 as uniformly as possible.

Figure 7:
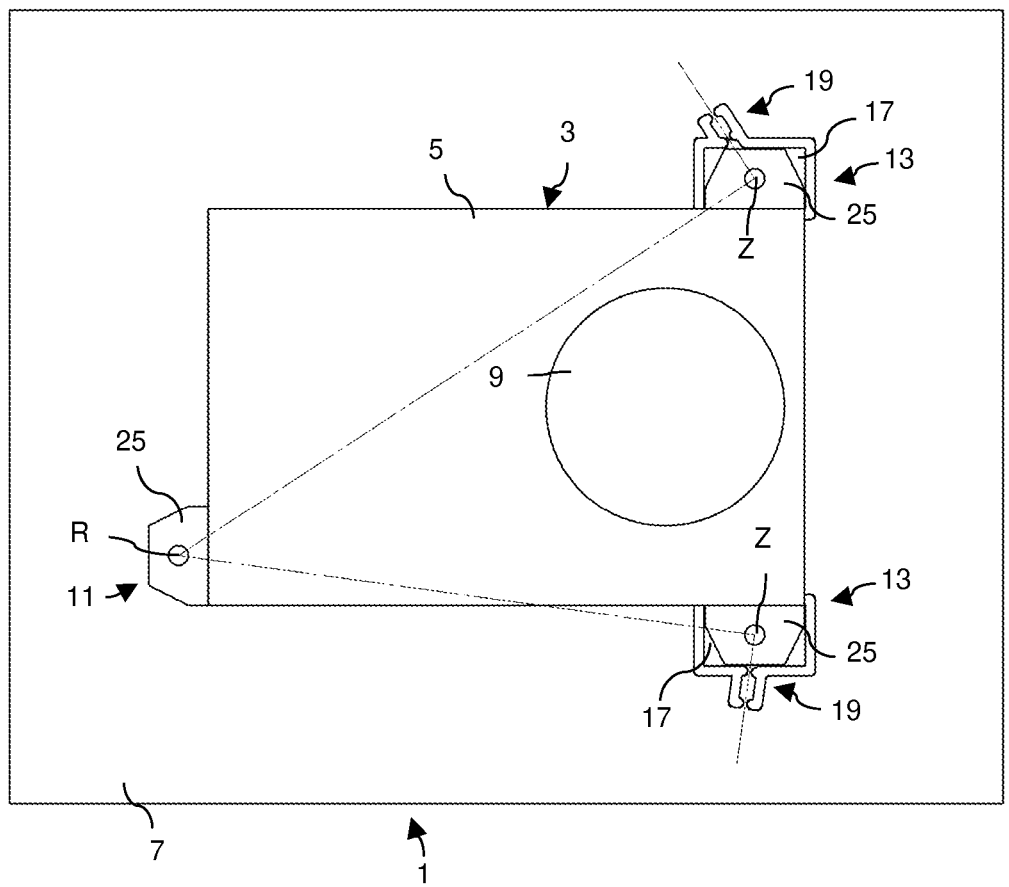
FIG. 7 shows a top view of another embodiment of a weighing device that is realized similar to FIGS. 1-3, wherein the mounting region that defines a stationary reference point is realized in a completely rigid fashion.

The variation of a weighing device 1 illustrated in FIG. 7 features a carrier plate 7 for the load cell 3, wherein the carrier plate 7, in contrast to the embodiment according to FIGS. 1-3, does not feature a separate connecting region in the mounting region 11. The corresponding leg 25 of the load cell 3 rather is rigidly connected to the carrier plate 7 directly by means of the bore illustrated in FIG. 7, wherein the intersecting point between the axis of the bore and the surface of the carrier plate 7 forms the reference point R.

Figure 4:
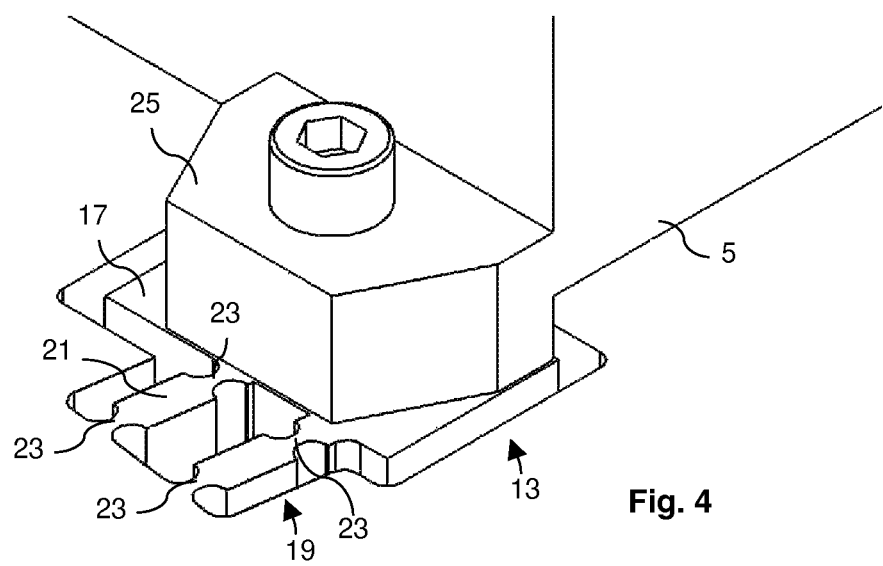
FIG. 4 shows an enlarged illustration of a mounting region of another embodiment that is realized similar to FIG. 1, but with a connecting region that is connected to the carrier plate by means of a parallelogram-like flexure hinge.

FIG. 4 shows another embodiment of a hinge structure that is realized in the form of a flexure hinge structure 19 and comprises two coupling elements 21 that are respectively connected to the connecting region 17 and the carrier plate 7 by means of flexure hinges implemented in the form of weak zones 23. The coupling elements 21 and the weak zones 23 define a parallelogram, wherein the pivoting axes defined by the weak zones 23 lie in two parallel center planes. The center planes simultaneously form the planes of symmetry for the weak zones 23 and the coupling elements 21.

A thusly designed flexure hinge structure 19 provides the advantage of a high rigidity and furthermore already allows only an essentially translatory motion of the connecting region 17 without a non-positive connection to the corresponding leg 25 of the housing 5.

Figure 5:
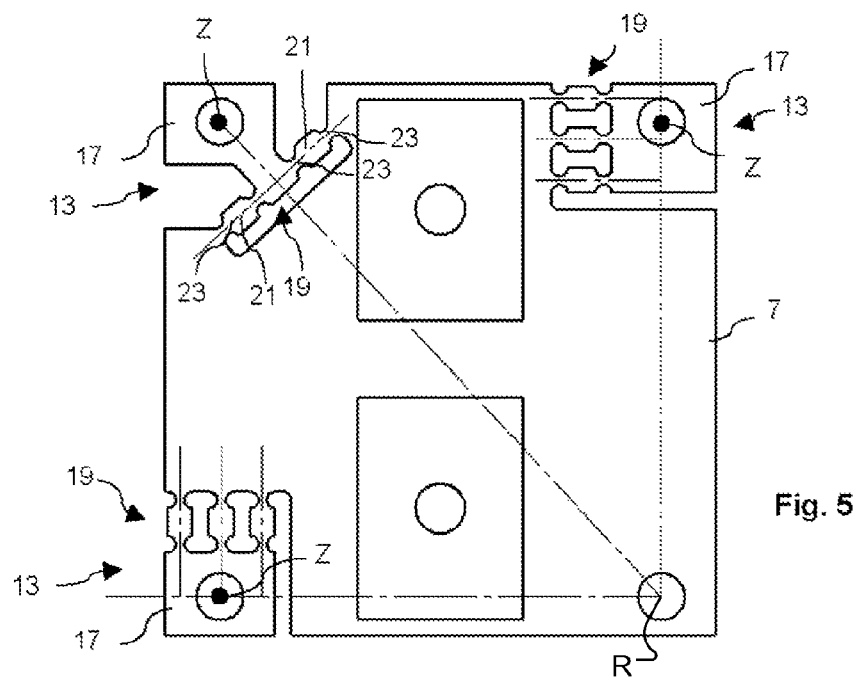
FIG. 5 shows a top view of a carrier plate for a load cell that can be screwed to the carrier plate in four mounting regions, wherein one of the mounting regions forms a stationary reference point.

FIG. 5 shows another alternative of a unit implemented in the form of a carrier plate 7 that can be connected to the housing 5 of a load cell 3. This carrier plate 7 also features a stationary mounting region 11 that comprises a bore for producing a screw connection with the element to be mounted on the base plate such as, for example, a load cell or a weighing sensor. The axis of the bore or the intersecting point of the axis with the surface of the carrier plate 7 forms the reference point R.

The carrier plate 7 furthermore comprises three connecting regions 17 that can be moved in a translatory fashion and respectively also feature a bore for producing a screw connection with the other element to be connected to the carrier plate 7. The connecting regions 17 are respectively arranged such that the center Z of each connecting region that respectively lies in the intersecting point between the axis of the bore and the surface of the respective connecting region 17 essentially can be moved along the straight connecting line through the reference point R and the respective center Z in a purely translatory fashion. For this purpose, two of the connecting regions 17 once again are respectively connected to the carrier plate 7 by means of a parallelogram-like flexure hinge structure 19. In contrast to the embodiment according to FIG. 4, however, the flexure hinge structure 19 features three parallelogram guides in this case, wherein each of these parallelogram guides is realized as illustrated in the embodiment according to FIG. 4.

The utilization of a larger number of parallelogram guides results in an improved torsional rigidity in directions or about rotational axes that do not correspond or are not parallel to the direction of the rotational axes of the respective weak zones.

The third movable connecting region 17 is connected to the carrier plate 7 by means of a flexure hinge structure 19 with two coupling elements 21 that are respectively connected to the connecting region by means of a weak zone 23 and to the carrier plate 7 by means of another weak zone 23. However, the two coupling elements are provided on opposite sides of the connecting region 17, wherein all pivoting axes formed by the weak zones 23 lie in one plane. This plane once again forms the center plane of the symmetrically realized coupling elements 21 and weak zones 23.

This variation of a flexure hinge structure 19 is particularly advantageous in instances in which the respective connecting region is situated on a corner of a rectangular carrier unit that lies diagonally to the reference point R as illustrated in FIG. 5.

Figure 6:
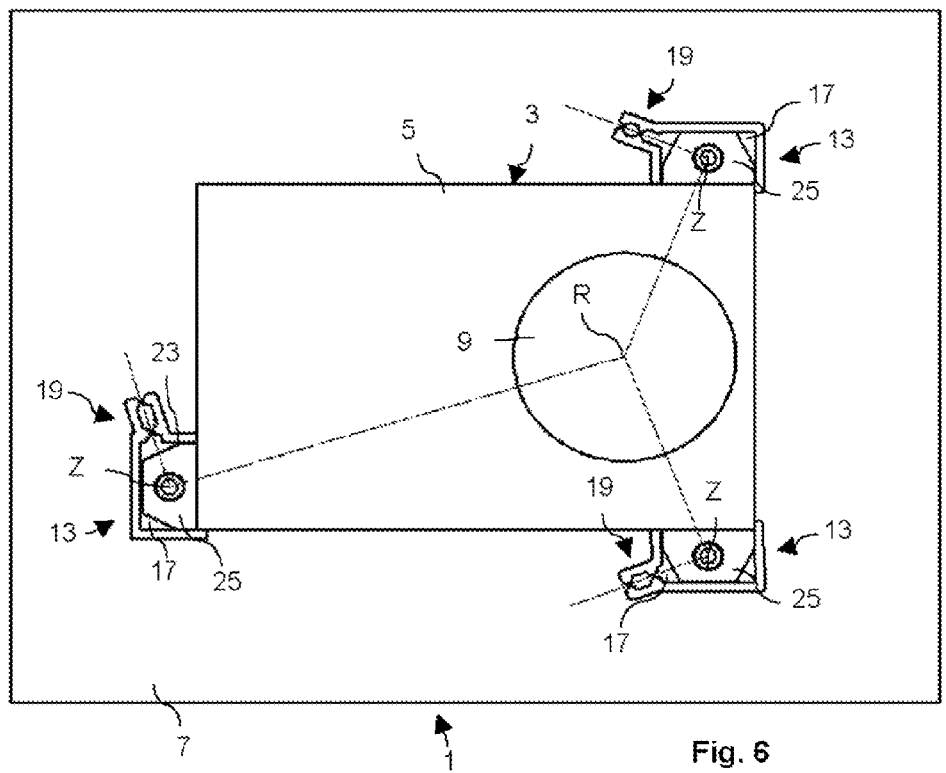
FIG. 6 shows a top view of a weighing device similar to FIG. 1, wherein a virtual reference point is defined, however, in the center of the load receptacle.

The top view of a weighing device 1 illustrated in FIG. 6 is largely identical or similar to the embodiment according to FIGS. 1-3. In contrast to the embodiment illustrated in FIG. 3, however, the connecting region 15 that is implemented as essentially rigid in FIG. 3 also consists of a connecting region 17 that can be moved in a translatory fashion. In this case, the reference point R is formed in the intersecting point of the vertical line through the center of the load receptacle 9 and the surface of the carrier plate 7. As in the embodiment according to FIGS. 1-3, the connecting regions are connected to the carrier plate 7 by means of simple flexure hinge structures 19 that are implemented identical to the flexure hinge structures 19 of the embodiments according to FIGS. 1-3. Only the essentially translatory moving directions are chosen slightly different, namely such that each of the connecting regions 17 can be respectively moved along the straight connecting lines through the centers Z of the connecting regions 17 (the intersecting points between the longitudinal axes of the bores for the screw connections and the respective surface of the connecting region 17) and the reference point R.

The above-described other variations naturally may also be used for these hinge structures. This also applies to any other structure of a flexure hinge that allows motion in the desired (essentially) translatory moving direction.

The embodiment of a weighing device 1 illustrated in FIG. 6 has the advantage that the center of the load receptacle 9 also remains exactly in the desired position if thermal expansions occur. This applies at least in instances in which the energy for the deformation of the individual flexure hinges 19 lies in the same order of magnitude.

Depending on the position of the centers Z in relation to the reference point R, the hinge structures may also be dimensioned with respect to the required deformation forces such that the position of the reference point R is very accurately maintained in the same location over at least a predefined working temperature range of the weighing device 1 during temperature-related expansions.

In addition to the utilization of connecting regions that can be moved in the respectively desired direction in a translatory fashion, the utilization of legs 25 on the housing 5 of a load cell 3 illustrated in the drawings or the utilization of legs on a component to be mounted on the carrier unit ensures that stresses generated due to the screw connection are not undesirably transmitted to the actual stress-sensitive component. For this purpose, the legs may be respectively connected to the actual housing by means of relatively thin connecting regions as illustrated in FIGS. 2 and 4.

The monolithic flexure hinge structures used in the above-described embodiments may also be realized with separate hinge elements. Instead of a weak zone, it would also be possible, for example, to utilize a separate leaf spring that naturally needs to be correspondingly held or clamped on both ends. Furthermore, a coupling element that features a hinge, for example, in the form of a weak zone on both ends may also be replaced with a leaf spring of corresponding length. In addition, a rigid coupling element with a conventional hinged connection on one or both ends may also be used. All these variations allow a shifting motion of the connecting region along a circular path that can be considered to be an essentially translatory motion for small motion travels.

In another embodiment described below, the aforementioned principle of a connection that is free of thermal stresses is not used for mounting a load cell on a carrier plate, but rather for connecting a load plate to a weighing sensor unit.

Figure 8:
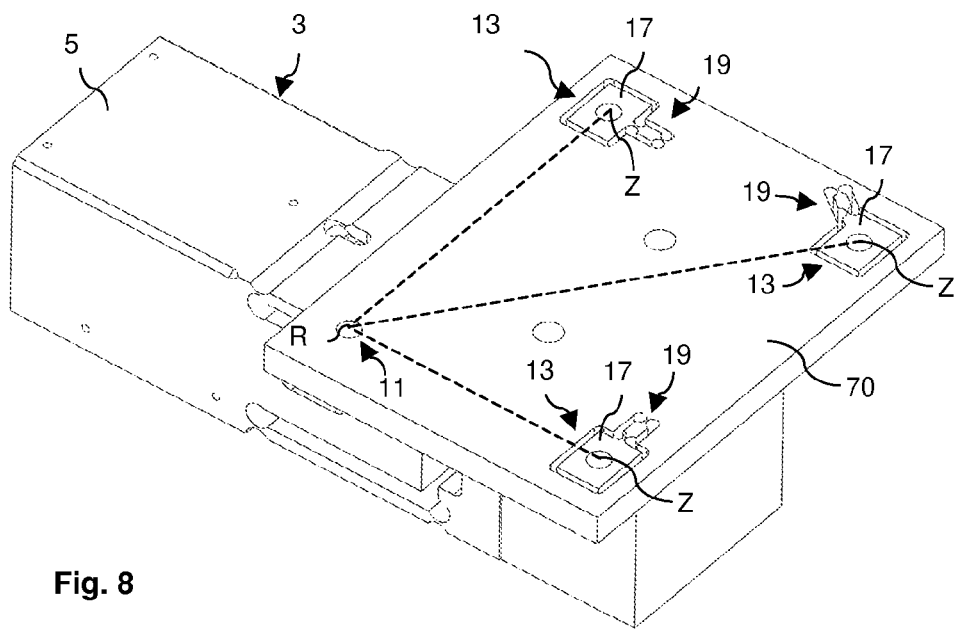
FIG. 8 shows a perspective top view of a weighing device consisting of a sensor unit that features an intermediate plate, on which a load plate is mounted in three mounting regions, wherein one of the mounting regions forms a stationary reference point.
Figure 9:
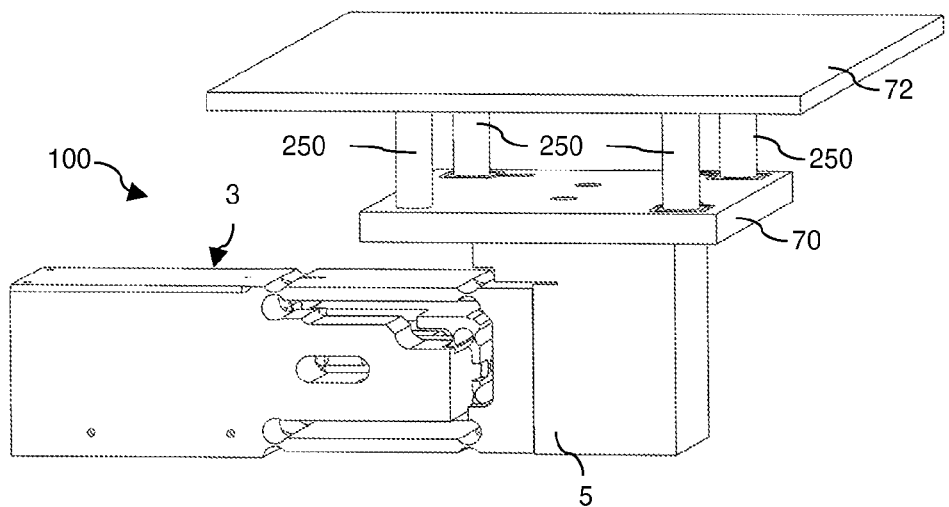
FIG. 9 shows a perspective side view of the weighing device according to FIG. 8, in which a load plate is mounted on the intermediate plate.

FIGS. 8 and 9 show a weighing device that features a weighing sensor unit 5, on the load receptacle region of which an intermediate plate 70 is realized. This intermediate plate 70 may be equipped in the same fashion as the carrier plate 7 described above in connection with FIGS. 1-5 such that another unit can be mounted on the intermediate plate 70 in a stress-free fashion.

According to FIG. 8, the intermediate plate 70 features a rigid mounting region 11, in which a bore for mounting the other unit is provided. This bore forms the reference point R. In addition, the intermediate plate 70 features three movable mounting regions 13, each of which has a movable connecting region 17 that is connected to the intermediate plate 70 by means of a flexure hinge 19. With respect to the arrangement and design of the flexure hinges, we refer to the embodiments described above in connection with FIGS. 1-7. In the embodiment illustrated in FIGS. 8 and 9, the mounting regions 11, 13 therefore are provided on the base body of the weighing sensor unit rather than on the unit to be connected to the base body as is the case in the above-described embodiments.

FIG. 9 shows another unit in the form of a load plate 72 with four cylindrical legs 250 that are connected to the intermediate plate 70 in a not-shown fashion, for example, with the aid of screws. The legs 250 may consist, for example, of an electrically and thermally insulating material such as a ceramic material in order to electrically and thermally insulate the load plate 72 from the load cell 3.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing device comprising:
(a) a weighing sensor unit;
(b) a second unit that is connected to the weighing sensor unit through three or more mounting regions;
(c) wherein the second unit or the weighing sensor unit includes a connecting region in at least two of the three or more mounting regions, wherein said connecting region is connected to the second unit or the weighing sensor unit with a hinge structure, the hinge structure being constructed such that it allows an essentially translatory shifting motion of the connecting region in a direction that is defined by a reference point (R) and a center (Z) of the connecting region and such that the motion travel allowed with the aid of the hinge structure is at least as large as the maximum difference between temperature-related expansions of the second unit and the weighing sensor unit along the line between the reference point (R) and the center (Z) of the connecting region in a predefined temperature range;
(d) wherein the hinge structure comprises at least one coupling element that is connected to the connecting region by means of a first hinge that is preferably realized in the form of a weak zone on one end and to the second unit or the weighing sensor unit by means of a second hinge that is preferably realized in the form of a weak zone on the other end, wherein the pivoting axes of the hinges extend parallel to one another and perpendicular to the direction of the straight connecting line through the center (Z) of the respective connecting region and the reference point (R).

2. The weighing device of claim 1, wherein the hinge structure is constructed in the form of a flexure hinge structure.

3. The weighing device of claim 2, wherein the hinge structure is constructed monolithically with the second unit or the weighing sensor unit.

4. The weighing device of claim 1, wherein the second unit is rigidly connected to the weighing sensor unit in one of the mounting regions, and wherein the center of this mounting region forms the reference point (R).

5. The weighing device of claim 1, wherein the mounting regions and the connecting regions lie in one plane.

6. The weighing device of claim 5, wherein the reference point (R) lies in an axis in which a load force acts upon the weighing sensor unit, and further lies in the intersecting point of the load force direction with the plane in which the mounting regions and the connecting regions lie.

7. The weighing device of claim 1, wherein the reference point (R) lies in an axis in which the load force acts upon the weighing sensor unit.

8. The weighing device of claim 1, wherein the second unit is a carrier unit constructed as a carrier plate and the connecting regions are respectively connected to the carrier plate by the hinge structure, or the second unit is constructed as a load plate and the connecting regions are respectively connected to the weighing sensor unit by the hinge structure.

9. The weighing device of claim 1, wherein the hinges are constructed such that the plane defined by the pivoting axes lies perpendicular to the straight connecting line through the reference point (R) and the center (Z) of the respective connecting region.

10. The weighing device of claim 9, wherein the hinge structure comprises two or more coupling elements that are respectively connected to the connecting region, and to the second unit or the weighing sensor unit by means of two flexure hinges that are preferably realized in the form of weak zones, wherein the pivoting axes of the hinges of one respective coupling element lie in one plane, and wherein one or more coupling elements are respectively arranged on opposite sides of the connecting region.

11. The weighing device of claim 1, wherein the hinge structure comprises two or more coupling elements arranged in a parallelogram-like fashion.

12. The weighing device of claim 1, wherein the weighing sensor unit or the second unit features mounting legs that stand on connecting regions of the second unit or the weighing sensor unit and are rigidly connected to the connecting regions.

13. The weighing device of claim 1, wherein the second unit is a carrier unit.

14. The weighing device of claim 1, wherein the second unit is a load unit or intermediate load unit.

15. A weighing device comprising:
 (a) a weighing sensor unit;
 (b) a second unit that is connected to the weighing sensor unit through three or more mounting regions;
 (c) wherein the second unit includes a connecting region in at least two of the three or more mounting regions, wherein said connecting region is connected to the weighing sensor unit with a hinge structure, the hinge structure being constructed such that it allows shifting motion of the connecting region in a direction that is defined by a reference point (R) and a center (Z) of the connecting region and such that the motion travel allowed with the aid of the hinge structure is at least as large as the maximum difference between temperature-related expansions of the second unit and the weighing sensor unit along the line between the reference point (R) and the center (Z) of the connecting region in a predefined temperature range;
 (d) wherein the hinge structure comprises at least one coupling element that is connected to the connecting region by means of a first hinge that is preferably realized in the form of a weak zone on one end and to the second unit or the weighing sensor unit by means of a second hinge that is preferably realized in the form of a weak zone on the other end, wherein the pivoting axes of the hinges extend parallel to one another and perpendicular to the direction of the straight connecting line through the center (Z) of the respective connecting region and the reference point (R).

16. The weighing device of claim 15, wherein the hinge structure is constructed in the form of a flexure hinge structure.

17. The weighing device of claim 16, wherein the hinge structure is constructed monolithically with the second unit.

18. The weighing device of claim 15, wherein the hinge structure comprises two or more coupling elements arranged in a parallelogram-like fashion.

19. A weighing device comprising:
 (a) a weighing sensor unit;
 (b) a second unit that is connected to the weighing sensor unit through three or more mounting regions;
 (c) wherein the weighing sensor unit includes a connecting region in at least two of the three or more mounting regions, wherein said connecting region is connected to the second unit with a hinge structure, the hinge structure being constructed such that it allows shifting motion of the connecting region in a direction that is defined by a reference point (R) and a center (Z) of the connecting region and such that the motion travel allowed with the aid of the hinge structure is at least as large as the maximum difference between temperature-related expansions of the second unit and the weighing sensor unit along the line between the reference point (R) and the center (Z) of the connecting region in a predefined temperature range;
 (d) wherein the hinge structure comprises at least one coupling element that is connected to the connecting region by means of a first hinge that is preferably realized in the form of a weak zone on one end and to the second unit or the weighing sensor unit by means of a second hinge that is preferably realized in the form of a weak zone on the other end, wherein the pivoting axes of the hinges extend parallel to one another and perpendicular to the direction of the straight connecting line through the center (Z) of the respective connecting region and the reference point (R).

20. The weighing device of claim 19, wherein the hinge structure comprises two or more coupling elements arranged in a parallelogram-like fashion.

\* \* \* \* \*